April 12, 1932.  W. G. ORTH  1,853,875
TAXIMETER
Filed April 22, 1924  2 Sheets-Sheet 1
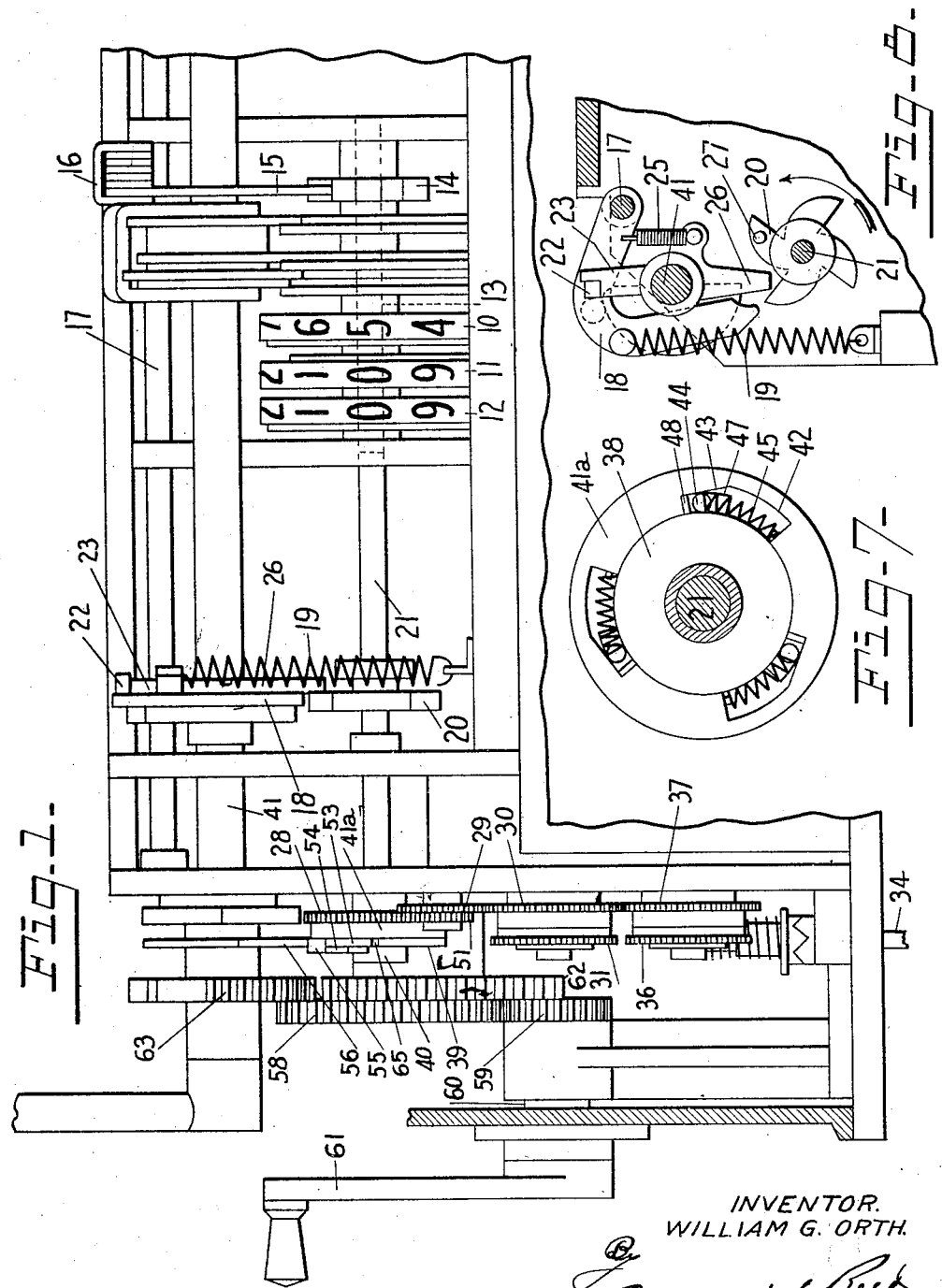
INVENTOR.
WILLIAM G. ORTH.
ATTORNEY.

April 12, 1932.  W. G. ORTH  1,853,875
TAXIMETER
Filed April 22, 1924  2 Sheets-Sheet 2
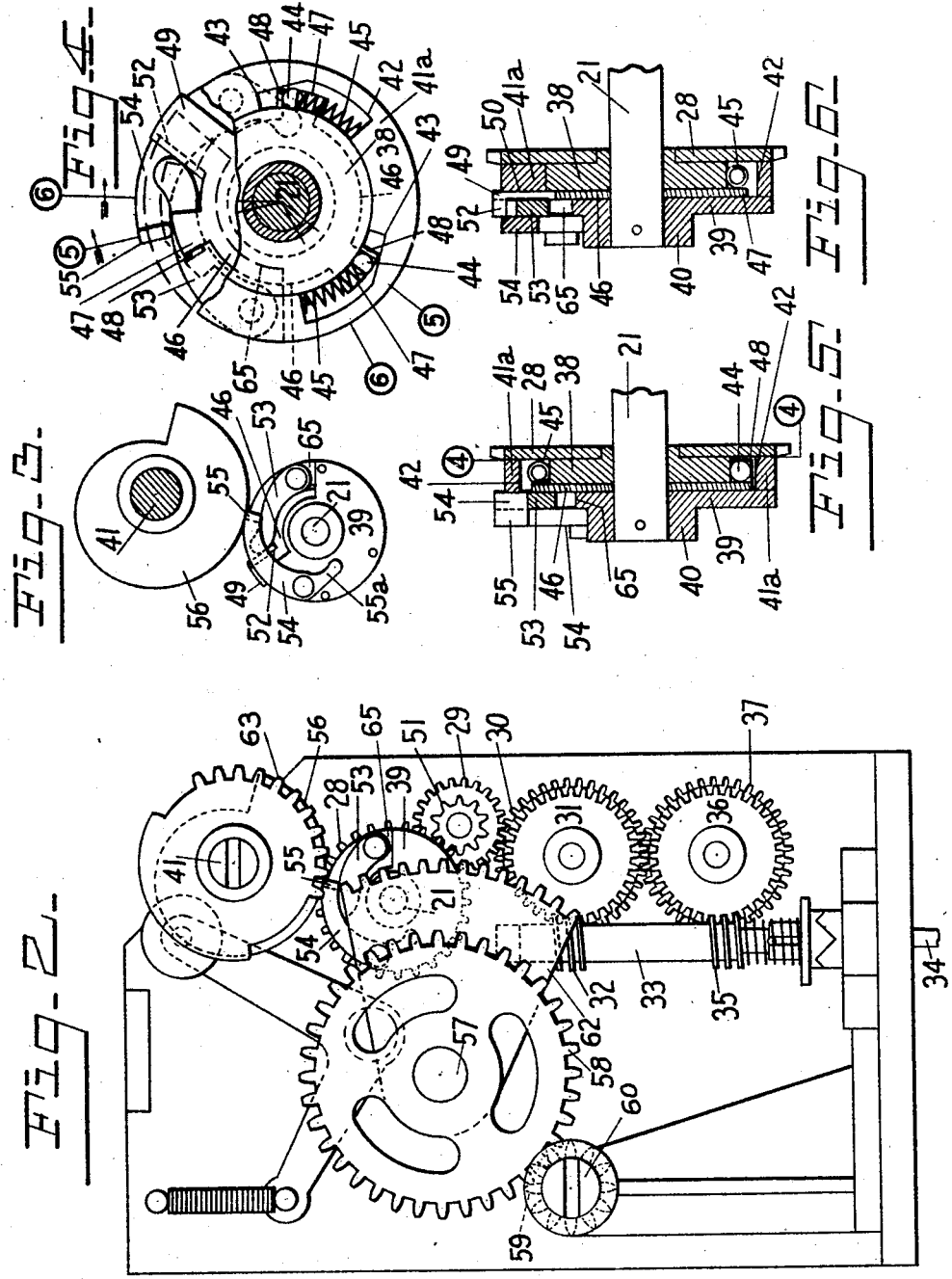
INVENTOR.
WILLIAM G. ORTH.
ATTORNEY.

Patented Apr. 12, 1932

1,853,875

UNITED STATES PATENT OFFICE

WILLIAM G. ORTH, OF DAYTON, OHIO, ASSIGNOR TO OHMER FARE REGISTER COMPANY, OF DAYTON, OHIO

TAXIMETER

Application filed April 22, 1924. Serial No. 708,241.

This invention relates to taximeters and is in the nature of an improvement upon the mechanism shown and described in the patent granted to William G. Orth and George H. Darst, January 25, 1927, No. 1,615,291.

The mechanism was designed more particularly for use in a taximeter of the type shown and described in the patent to Ohmer and Breidenbach, No. 1,136,164, of April 20, 1915. In the taximeter of that patent the fare counter is operated by an actuating device which may be driven either from a moving part of the vehicle or from a clock. The connection between the moving part of the vehicle and the actuating device comprises a train of gearing, one of the gears of which is permanently connected with the actuating device and is movable into and out of mesh with another gear of the train, to permit the actuating device to be connected with or disconnected from the moving part of the vehicle. This movable gear is controlled by the position of the flag. When the flag is in its normal, or "for hire", position, the movable gear will be out of mesh with the other gear and the movement of the vehicle will not affect the actuating device or the fare counter. When the flag is in its lowered or "hired" position the movable gear will be in mesh with said other gear and any movement of the vehicle will be transmitted through the actuating device to the fare counter. When the flag is lowered and the movable gear is moved into mesh with said other gear the teeth of the two gears are not always in alinement and the teeth of the movable gear engaging the teeth of the other gear will cause the movable gear to be rotated slightly about its axis, thus shifting the position of the actuating device. The movement imparted to the actuating device is small, but the actuating device advances the fare counter periodically and this small change in the position of the actuating device may result in an operation of the fare counter which would not have taken place if the actuating device had not been shifted by the meshing of the gears. In the above mentioned patent this difficulty was overcome by providing means for disconnecting the movable gear from the counter actuating device while that gear was being moved into mesh with the driving gear.

One object of the present invention is to provide a machine of this kind in which the several gears of the driving mechanism will be permanently in mesh and in which the driving mechanism will be automatically disconnected from and connected with the counter actuating device by the normal operation of the machine.

A further object of the invention is to provide a clutch operating device for connecting the driving mechanism with the counter actuating device which will be controlled by the position of the flag.

A further object of the invention is to provide such a mechanism which will be simple in its construction and operation and which can be applied to the taximeter without modification of other parts thereof.

Other objects of the invention will appear as the device is described in detail.

In the accompanying drawings Fig. 1 is a front elevation of a portion of a taximeter embodying my invention; Fig. 2 is an end elevation of the same; Fig. 3 is a side elevation of the clutch and its controlling cam; Fig. 4 is a section taken on the line 4—4 of Fig. 5, partly broken away; Fig. 5 is a section taken on the line 5—5 of Fig. 4; Fig. 6 is a section taken on the line 6—6 of Fig. 4; Fig. 7 is a section taken on the line 4—4 of Fig. 5, showing the clutch members complete; and Fig. 8 is a detail view of the counter actuating device.

In these drawngs I have illustrated one embodiment of my invention and have shown the same as applied to a taximeter of the type shown in the above mentioned patent but it will be understood that the invention may be used in taximeters or the like of various kinds and that the mechanism may take various forms without departing from the spirit of the invention.

In these drawings I have illustrated and will now describe only so much of the taximeter mechanism as is necessary to an understanding of the present invention. As here shown, the taximeter comprises a fare registering device which, in the present instance, is in the form of a rotatable fare counter. The tens of cents counter is shown at 10 while the units of dollars counter is shown at 11, and the tens of dollars counter is shown at 12. These counters are in the form of wheels, or drums, rotatably mounted upon a counter shaft 13, which also constitutes a resetting shaft, as will hereinafter appear. The units of cents counter wheel is not used because in the present machine the fare is registered in units of ten cents and the final figure is always a cypher and is, therefore, placed upon a fixed part of the mechanism, not shown, in a position in which it will aline with the indications on the fare counter wheels. The tens of cents counter 10 is operatively connected with a ratchet wheel 14 and the count is transferred from the counter 10 to the counter 11 and from the counter 11 to the counter 12 by transfer mechanism of any suitable character. The ratchet wheel 14 is actuated by a pawl 15 carried by an arm 16 rigidly secured to a shaft 17 extending lengthwise of the machine and this shaft is rocked about its longitudinal axis to cause the pawl 15 to periodically engage the ratchet wheel and advance the fare counter. An arm 18 is rigidly secured to the shaft 17 and is acted upon by a spring 19 which serves to move the shaft in a direction to cause the pawl 15 to rotate the ratchet wheel 14. The arm 18 is moved in the opposite direction, against the tension of the spring 19, by a suitable actuating device, which is here shown as a cam 20 mounted on a cam shaft 21 and arranged to engage the end of the arm 18 to raise the same against the tension of the spring 19 and then release the arm to permit it to be moved downwardly by the spring 19. In the present construction the actuating cam is a four leaf cam and the pawl will be actuated four times for each complete rotation of the shaft 21 and each operation of the pawl will add ten cents to the fare counter.

When the taximeter is placed in service, that is, when the flag is lowered, to indicate that the vehicle has been hired, the fare counter will indicate a certain minimum fare which is due regardless of the distance traveled by the machine. This minimum fare may, in the present instance, be assumed to be twenty cents. It is, therefore, desirable that the actuating mechanism for the fare counter should remain inoperative until the distance traveled, or the waiting time, has equaled the minimum fare, after which the actuating mechanism should become operative. In the present machine, this is accomplished by providing the arm 18 with a stud 22 which is engaged by a detent 23 pivotally mounted on the flag shaft 41 and acted upon by a spring 25 which serves to move it into the path of the projection 22 when the arm 18 is in its elevated position. The arm 18 is elevated when the fare counter and actuating cam are returned to their normal positions at the end of each trip, as will be hereinafter explained, and the detent 23 then engages the projection, or stud, 22 and locks the arm in its elevated position. A trip arm 26 is connected with the detent 23 and arranged in the path of a pin 27 carried by the cam 20. This pin is so arranged on the cam that when the latter is in its initial position it will be spaced such a distance from the trip arm that it will not engage and operate that arm until the cam has been rotated, either by the vehicle or by the clock, a certain specified distance. When this movement of the cam has been completed the pin will actuate the trip arm and move the detent out of engagement with the projection 22, thereby releasing the arm 18 and allowing it to move into operative engagement with the cam.

The actuating device, or cam, 20 may be rotated either from the moving part of the vehicle or from a clock mechanism, but inasmuch as the present invention has no relation, in the present mechanism, to the clock drive it is not necessary to describe this part of the mechanism. The shaft 21 on which the cam 20 is mounted is operatively connected with a moving part of the vehicle, such as one of the wheels, and as here shown, the shaft 21 has mounted thereon a gear 28 with which meshes a pinion 51 having secured thereto a gear 29, which gear is adapted to mesh with a gear 30 having connected therewith a worm gear 31 with which meshes a worm 32 on the worm shaft 33, the worm shaft being connected at 34, preferably by means of a flexible shaft, with the moving part of the vehicle. The worm shaft 33 has, in the present instance, a second worm 35 which actuates a second worm wheel 36 with which is connected a gear 37 meshing with the gear 30, the gears being connected with the worm wheels by overrunning clutches, not here shown, so that either worm wheel can be rotated independently of the other, the arrangement being such that the actuating device for the fare counter will be rotated in the same direction regardless of the direction in which the vehicle is moving.

The gear 28 is loosely mounted about the axis of the shaft 21 for rotation relatively to that shaft and is in permanent mesh with the pinion 51 while the gear 29, to which the gear 51 is rigidly secured, is in permanent mesh with the gear 30, this train of gears constituting a driving mechanism for the counter actuating device. Means are provided and controlled by the position of the flag for connecting the gear 28 with and disconnecting the same from the shaft 21. As here shown, this means comprises a clutch consisting of a disk-like member 38 loosely mounted on the shaft 21 and to which the gear 28 is rigidly secured, and a second member 39 which is also shown in the form of a disk having a hub portion 40 pinned, or otherwise rigidly secured, to the shaft 21. The clutch member 39 is provided with a circumferential laterally extending portion or flange 41a which overlaps the disk-like member 38 and is rotatable about that member. One of the clutch members, preferably the flange of the member 39, is provided in that face adjacent to the other member, with a plurality of recesses 42 each having one end portion tapered toward the disk, as shown at 43. These recesses open through the inner surface of the flange and the inner walls thereof are formed by the peripheral surface of the disk 38. Mounted in each recess 42 is a connecting member here shown as a ball 44 of such a size that when moved into the tapered end portion of the recess it will be brought into wedging contact with the two clutch members, that is, with the periphery of the disk 38 and with the tapered or inclined wall of the flange of the member 39 and will thus rigidly connect the two members of the clutch one to the other, when the gear 28 is rotated in a direction toward the tapered ends of the recesses. When the balls are moved away from the tapered ends of the recesses they will move out of contact with the outer walls of the recesses and the two clutch members will be disconnected. Each ball is acted upon by a spring 45 confined between the same and the opposite end of the recess, which spring tends normally to press the ball toward the tapered end of the recess and into wedging contact with the two clutch members. A suitable actuating device is provided for moving the balls away from the tapered ends of the recesses to release the clutch members and, as here shown, this device comprises a plate 46 rotatably mounted on the shaft 21 between the disks 38 and 39 and having a series of radial projections 47 each of which is provided with a transverse finger 48, which fingers extend into the corresponding recesses between the respective balls 44 and the small ends of the recesses, whereby the movement of the actuating device or plate 46 in one direction will force the balls out of the tapered portions of the recesses. This actuating device or plate is also provided with an arm or radial projection 49 extending outwardly through an opening 50 in the flange 41a and provided at its outer end with a transverse projection 52. Pivotally mounted on the disk 39 is an arm 53 the free end of which bears against the projection 52 on the arm of the actuating plate, the arm 53 being preferably located in a recess 65 in said disk 39. Pivotally mounted on the disk 39 at a point remote from the axis of the arm 53 is a lever 54 having its end turned transversely to form a finger or projection 55 which extends across and rests normally upon the outer edge of the arm 53. This lever is also provided with a projection or tail piece 55a arranged to engage the hub 40 of the disk 39 and limit the outward movement of the lever. The transversely extending projection or finger 55 of the lever 54 is so arranged that when the cam shaft 21, which carries the clutch, is in its initial position the fingers 55 will be in the path of a cam 56 which is rigidly secured to the flag shaft 41 for rotation therewith. This cam is so shaped and arranged that when the flag is in its normal "for hire" position the cam will bear upon the end of the lever, press the same inwardly against the arm 53 and cause this arm to act upon the actuating device 46 and rotate the same in a direction to move the clutch balls into their inoperative positions, thereby disconnecting the driving mechanism from the counter actuating device when the flag is in its "for hire" position. When the flag is moved to its hired position the cam will be moved out of engagement with the lever 54 and this lever and the arm 53 will thereby be released so that the actuating plate 46 may be rotated by the pressure of the springs 45 on the balls 44, thus permitting these balls to be moved into wedging contact with the two clutch members and causing these members to be again connected one with the other.

It will be apparent, therefore, that the clutch connection between the driving mechanism and the counter actuating device is controlled by the position of the flag. The flag may be moved from one position to the other in any suitable manner but, in the present machine, it is moved into its lowered or "hired" position manually, that is, the operator grasps the flag itself and moves it downwardly. The flag is restored to its normal or "for hire" position through the operation of resetting the fare counter and the actuating device therefor to their initial positions, which is done at the end of each trip. This resetting may be accomplished in any suitable manner but the present machine contains printing mechanism by means of which a record of each fare is printed and in addition to the record a ticket is printed and issued showing the amount of fare due and the resetting mechanism is operated from the printing mechanism. The printing mechanism comprises the printing shaft 57 having mounted thereon a gear 58 which meshes with a pinion 59 on a stud rotatably mounted on a stud shaft 60 and adapted to receive a crank 61 or other suitable device for rotating the same, the movement of this printing shaft is transmitted through mechanism, not here shown, to the counter shaft 13 and this shaft has connected therewith suitable parts cooperating with the fare counters and with the cam shaft 21 for restoring the same, together with the cam 20 and the clutch to their initial positions, but as this mechanism forms no part of the present invention it is not described or illustrated. Connected with the printing shaft 57 is a toothed segment 62 which engages a mutilated gear 63 on the flag shaft 41 and thus rotates that shaft in a direction to lift the flag and restore the same to its normal or "for hire" position. Thus it will be seen that the clutch which connects the driving mechanism with the counter actuating device is automatically operated by the normal operation of the taximeter mechanism, this operation in the present instance being accomplished through the manipulation of the resetting mechanism.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent is:

1. In a machine of the character described, a counter actuating device, driving mechanism comprising a train of gears permanently in mesh one with the other, a clutch to connect one of said gears with said counter actuating device, said clutch and said gear being held against axial displacement, a flag movable from one position to another, and means controlled by said flag to control the operation of said clutch.

2. In a mechanism of the character described, a counter, an actuating device therefor, driving mechanism comprising a train of gears permanently in mesh one with the other, a clutch to connect one of said gears with said counter actuating device, said clutch and said gear being held against axial displacement, means for resetting said counter to its initial position, and means controlled by said resetting means to control the operation of said clutch.

3. In a machine of the character described, a counter actuating device, driving mechanism comprising a train of gears permanently in mesh one with the other, a clutch to connect one of said gears with said counter actuating device, said clutch and said gear being held against axial displacement, a flag movable from one position to another, and a cam arranged substantially in the plane of said clutch and connected with said flag to act on said clutch to control the operation thereof.

4. In a mechanism of the character described, a counter, an actuating device therefor, driving mechanism comprising a train of gears permanently in mesh one with the other, a clutch to connect one of said gears with said counter actuating device, said clutch and said gear being held against axial displacement, means for resetting said counter to its initial position, and a cam arranged substantially in the plane of said clutch and actuated by said resetting means and acting on said clutch to control the operation thereof.

In testimony whereof, I affix my signature hereto.

WILLIAM G. ORTH.